United States Patent [19]

Ditty

[11] 4,386,560

[45] Jun. 7, 1983

[54] SPIRAL MEAT SLICER

[75] Inventor: Allan V. Ditty, Grosse Pointe Woods, Mich.

[73] Assignee: Portable Tool & Electronics, Inc., Warren, Mich.

[21] Appl. No.: 151,625

[22] Filed: May 20, 1980

Related U.S. Application Data

[63] Continuation-in-part of Ser. No. 41,767, May 24, 1979, abandoned.

[51] Int. Cl.[3] .......................... A23N 7/00; A47J 17/00

[52] U.S. Cl. ......................................... 99/538; 99/593; 99/594

[58] Field of Search ................. 99/537, 538, 593, 598, 99/541, 597; 83/411, 425; 403/355, 356, 358; 64/1 V; 277/152, 153

[56] References Cited

U.S. PATENT DOCUMENTS

| | | | |
|---|---|---|---|
| 2,571,267 | 10/1951 | Ljunggren | 64/1 V |
| 3,260,542 | 7/1966 | DiMilla | 403/356 |
| 3,606,352 | 9/1971 | Lutz | 277/153 |
| 4,170,174 | 10/1979 | Ditty et al. | 99/538 |

*Primary Examiner*—Philip R. Coe
*Assistant Examiner*—Timothy F. Simone
*Attorney, Agent, or Firm*—Harry R. Dumont

[57] ABSTRACT

A spiral meat slicer is provided which operates to form a continuous spiral slice on a piece of meat such as a ham or roast which has a central bone structure of non-uniform diameter. Included in the slicer is an improved elevator and oscillator which provide the necessary cutting action in a manner to avoid unnecessary vibration and further permits ready access for servicing as well as increased durability.

12 Claims, 17 Drawing Figures

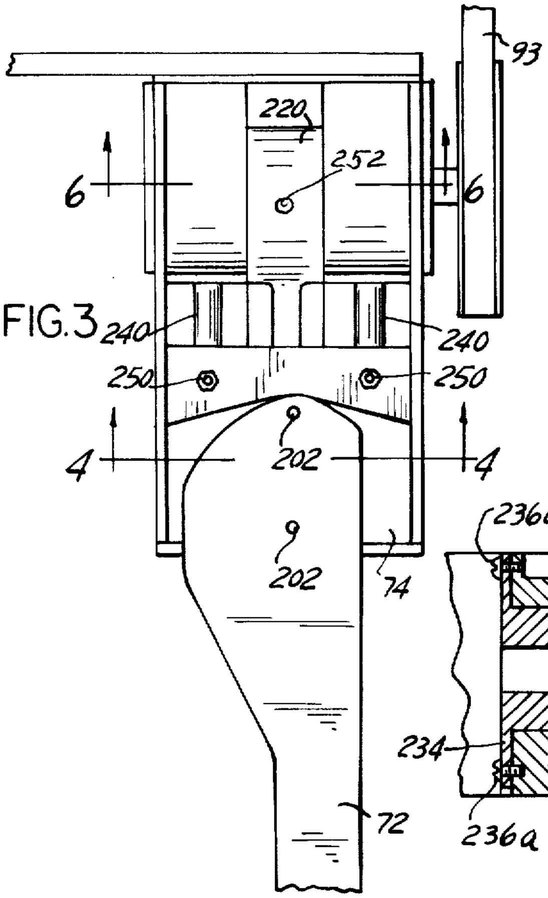
FIG.3
FIG.7
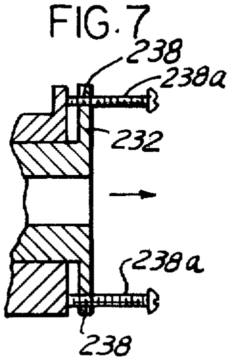
FIG.6
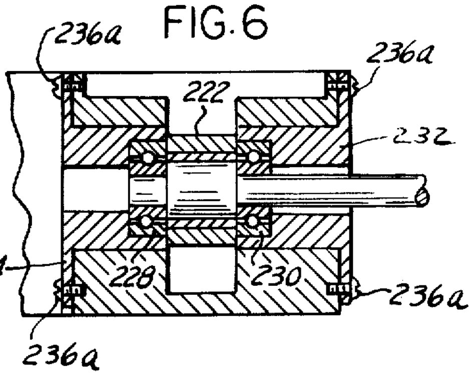
FIG.4
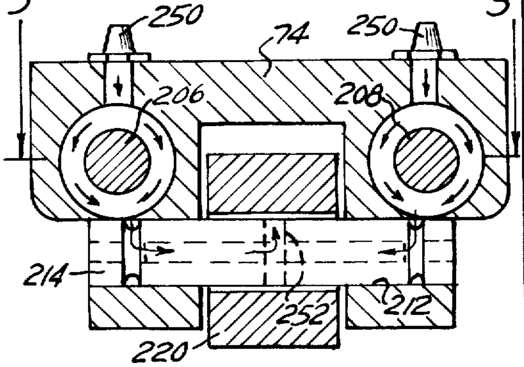
FIG.5
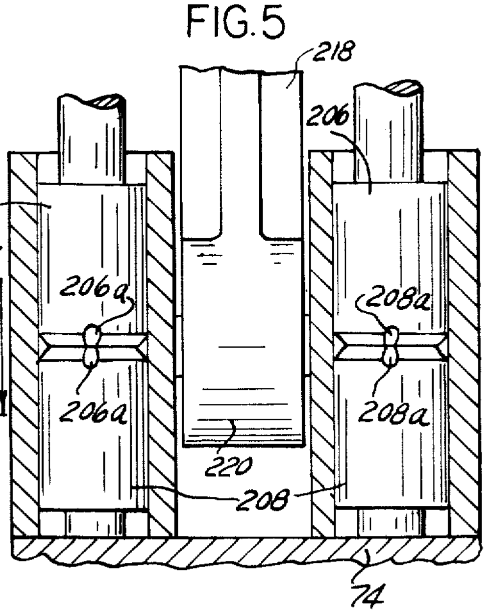

FIG.8
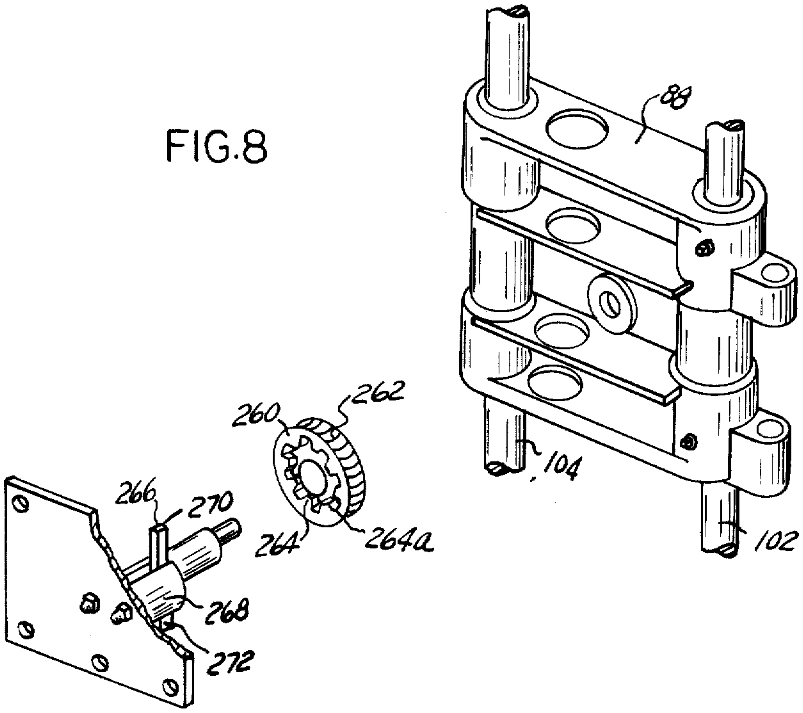
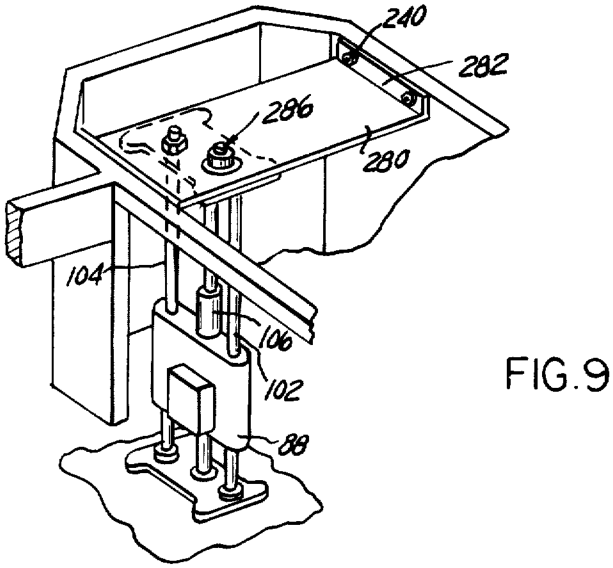
FIG.9

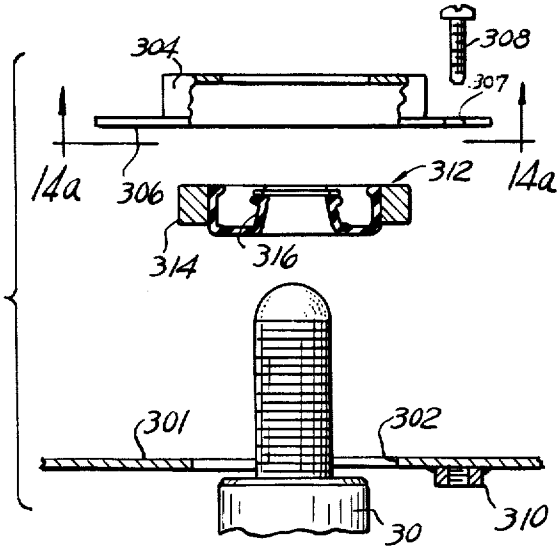
FIG. 14
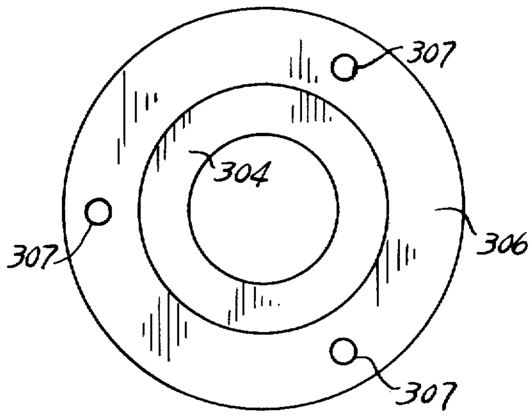
FIG. 14a
FIG. 15
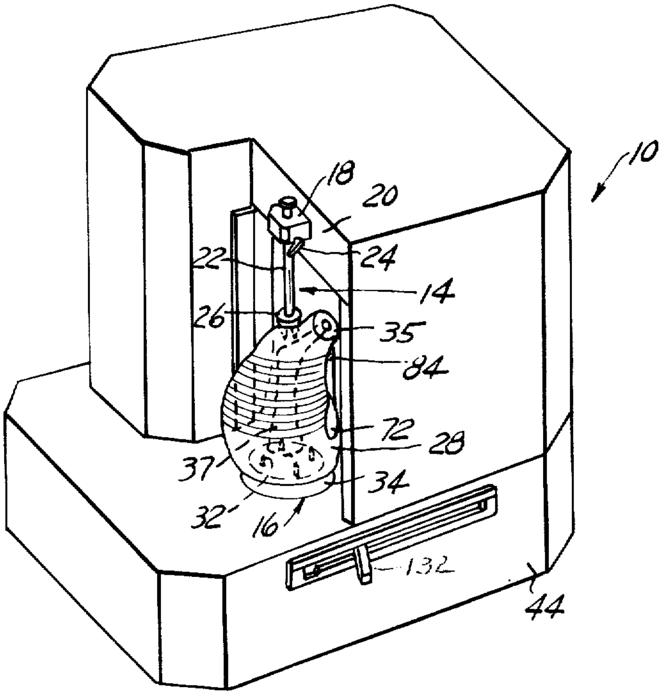
FIG. 16
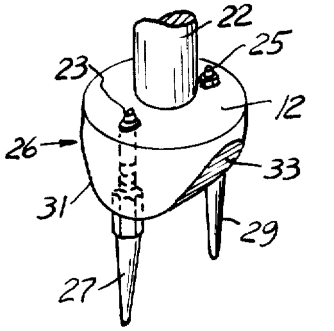

SPIRAL MEAT SLICER

REFERENCE TO RELATED APPLICATIONS

This application is a continuation-in-part of Allan V. Ditty, U.S. patent application No. 06/041,767 filed on May 24, 1979 now abandoned.

BACKGROUND OF THE INVENTION

U.S. Pat. No. 3,153,436 issued to R. G. Chesley on Oct. 20, 1964 discloses one form of a spiral meat slicer. The present invention comprises an improvement over such a spiral meat slicer.

Additional spiral meat slicers are shown in Herman E. Frentzel, U.S. Pat. No. 3,951,054 issued on Apr. 20, 1976 for "Meat Slicer" and in L. C. Schmidt and Richard P. Farbolin, U.S. Pat. No. 4,050,370 issued on Sept. 27, 1977 for "Spiral Meat Slicer With Improved Reciprocating Knife Structure." The spiral meat slicers disclosed in the aforementioned patents have proved to be generally operable in service. However, a major problem encountered with spiral meat slicers of the type disclosed in and claimed in the above patents is that various parts, particularly the structures associated with the knife holder, oscillator and carriage have been subject to rapid wear. The wear generally occurs because of excessive vibration of parts of this reciprocating knife structure used for cutting the meat. A variety of adjustment problems have been found to exist in connection with maintaining such devices.

The present invention has reference to a number of improvements which coacting provide a substantial improvement in the durability and service of the spiral meat slicer oscillator. The present invention provides an improved elevator assembly mounting system whereby it is possible through an improved bridge structure to simplify the mounting apparatus and facilitate the manner by which the elevator assembly could be removed for servicing or adjusting.

The present invention further includes an arrangement for an improved end play adjustor assembly which controls the vertical movement of the knife. The improved end play adjustor assembly increases the servicability of the assembly and provides a more uniform slice of meat.

A still further improvement afforded by the present invention is the elevator lock and release mechanism which greatly facilitates removal of excess movement in the elevator assembly.

A still further improvement arising from the present invention relates to an improved oscillator and associated mechanism.

SUMMARY OF THE INVENTION

The meat slicer operates to form a continuous slice on a cut of meat having an irregularly shaped or regularly shaped bone extending through it. The slicer includes means for mounting the meat with its bone as a substantially vertical axis about which the meat is rotated. A vertically moveable carriage is provided and a knife for slicing the meat is mounted on the carriage. The knife is positioned transversely with respect to the axis of rotation of the bone to enable the spiral cut to be made in the meat. A means is provided for longitudinally oscillating the knife to provide a cutting action. Means are also provided for automatically tensioning the knife against the meat. Adjustment means are provided for the tensioning means. Still further means are provided for rotating the meat as the cut is made and for relatively moving the carriage with respect to the meat. Means are provided for eliminating the final upward movement of the carriage. The tensioning means are operable in a manner to permit cutting a boneless piece of meat as disclosed and claimed in the aforementioned Ditty Application No. 06/041,767.

BRIEF DESCRIPTION OF THE DRAWINGS

A description of a preferred embodiment of my invention will be made in this specification with respect to the accompanying drawings wherein:

FIG. 3 is a fragmentary top plan view of the apparatus used for mounting and supporting the knife for oscillatory movement;

FIG. 4 is a sectional view taken along the section line 4—4 of FIG. 3;

FIG. 5 is a sectional view taken along the section line 5—5 of FIG. 4 showing further detail of the construction of a portion of the oscillator mechanism;

FIG. 6 is a sectional view taken along the section line 6—6 of FIG. 3;

FIG. 7 is apartial view to enlarged scale showing the apparatus used to remove bearing holders from the oscillator housing;

FIG. 8 is a spread perspective view with parts broken away to show the parts of the elevator gear lock and release mechanism;

FIG. 9 is a fragmentary perspective view of a new bridge plate construction and a modification of the one shown in FIG. 1;

FIG. 14 is an exploded view partly in section showing a self-aligning seal mount used in connection with my apparatus;

FIG. 14*a* is a top plan view of the device of FIG. 14;

FIG. 15 is a view in perspective of the slicer showing a ham mounted thereon; and FIG. 16 is a view in perspective of the upper prong structure for holding the meat.

DETAILED DESCRIPTION OF THE PREFERRED EMBODIMENT

Figure 1:
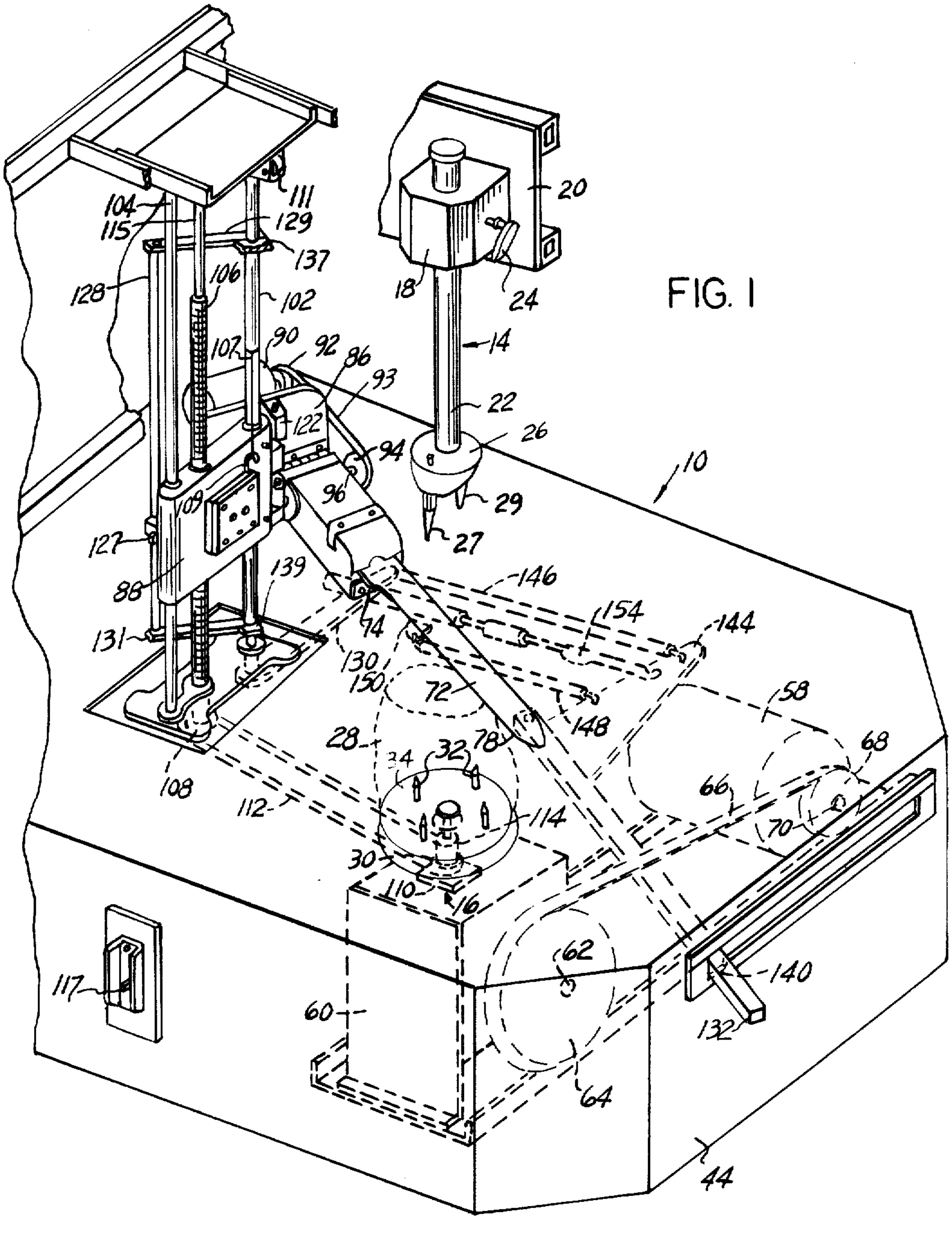
FIG. 1 is a perspective view of one embodiment of the meat slicer according to the present invention with parts broken away to assist in clarifying its construction.

Reference is made to FIG. 1 for its generalized view of the spiral meat slicer 10. Included in the slicer 10 is the means for mounting the meat which includes an upper axially adjustable support 14 and a lower rotatively driven support 16. The upper support 14 includes a laterally extending bracket 18 having a vertical opening therethrough. The bracket 18 is fixed to a support frame member 20. Slideably received in the bracket 18 is an axially adjustable rod 22. The rod 22 is secured in different adjusted positions by means of a set screw 24.

A further rotatable prong structure 12 is provided at the lower end of the rod 22 to engage a ham 28 as best shown in FIG. 15. The rotatable prong structure 12 is rotatably mounted on the lower end of the rod 22. A set of prongs 27 and 29 are threadably engaged on the underside of the prong structure 12.

The lower rotatably driven support 16 includes a power driven shaft 30 extending upwardly. Carried on the shaft 30 is an upwardly extending prong structure 32 which engages the lower end of the ham or other meat cut. The prong structure 32 is mounted unto a disc shaped cover 34 and provides a sturdy meat supporting surface.

In mounting a ham, for example, the butt end of the ham is inserted on the prong structure 32 to a position where the lower end of the ham rests on the plate 34. The leg bone of the ham is positioned so that it forms an axis of rotation for the ham. After the ham has been positioned on its lower support, the upper support 14 is lowered to insert the prongs 27, 29, 31 into the shank end of the ham. Set screw 24 is then tightened and the ham is in position for beginning a slicing operation.

As already indicated, the lower support shaft 30 is power driven. The power drive means for the shaft 30 includes a drive mechanism mounted in a housing 44. Contained within the housing 44 are an electrical motor 58 and a gear box 60. A shaft 62 extends exteriorly of the gear box 60 and has mounted on its exterior end a pulley wheel 64. The pulley wheel 64 is connected by a belt 66 to a pulley 68 which is attached to the output shaft 70 of the motor 58. The shaft 30 is connected to one output of the gear box 60 and is rotatively driven thereby to cause rotation of the ham or other cut of meat during cutting.

The basic elements of the reciprocating knife structure are shown generally in FIG. 1. The structure includes a knife blade 72 which is secured at one end by means of screws to a moveable support block 74.

The free end of the knife blade 72 extends to a point beyond the vertical axis of the meat supporting members 14, 16. The blade is preferably oriented to permit it to follow the angle of the helix which it cuts on a piece of meat. This may be done by tilting the blade with respect to the horizontal or by providing a bevel on the underside of the blade extending from the cutting edge 78.

In this configuration, the blade must be relatively thick as, for example, one-eighth of an inch. The upper surface of the blade 72 and the surface defined by the bevel form a V-shaped configuration terminating in the cutting edge 78. This V, assuming the upper and lower surfaces of the blade to be oriented substantially in the horizontal plane, results in aiming the apex, or cutting edge 78 of the blade, upwardly in the desired manner to follow the angle of the helix which is cut on the ham 28.

Theoretically, the angle of the blade should be adjusted for each different helix it is desired to cut. However, it has been found in practice that if the blade is oriented to correspond to the generally desired helix, it will perform satisfactorily.

The block 74 is mounted for reciprocal movement in a housing 84. The housing is secured on a vertically oriented plate 86. The plate 86 is pivotally mounted on a vertically movable carriage 88. An electric motor 90 is mounted on the reverse side of the plate 86. The output shaft of the motor carries a pulley 92 which is drivingly connected by a belt 93 to a pulley 94 mounted on shaft 96. The shaft 96 is operatively connected to a crank and cam structure to be shown in detail in FIGS. 2-7, hereinafter to cause reciprocation of the block 74. As will be appreciated, reciprocal motion of the block 74 will cause the knife blade 72 to reciprocate in a cutting action.

The means for moving the knife blade structure upwardly may best be seen in FIG. 1. As previously mentioned, the plate 86 which carries the knife blade structure is mounted on the vertically movable carriage 88. The carriage 88 may be conveniently fabricated as a casting. The carriage 88 is mounted for sliding movement on spaced apart vertical guides 102, 104. A vertical worm 106 controls the vertical movement of the carriage 88. The worm 106 is rotatably driven by the motor 58 through the gearbox 60. As may best be seen in FIG. 1, the lower end of the worm carries a sprocket 108. The sprocket 108 is connected to a sprocket 110 by means of a chain 112. Sprocket 110 is mounted on a shaft 114 which extends into the gearbox 60 wherein it is driven.

The worm 106, when rotated, is effective to raise the carriage 88. A worm gear is provided within the carriage to engage the worm 106. The worm gear has an associated clutch mechanism whereby to engage the worm only during periods when it is desired to raise the carriage. The upper end 115 of worm 106 is unthreaded. This is a safety feature which limits upward movement of the carriage 88. In the event the operator does not stop the slicer by actuating switch 117 (FIG. 1) after the meat is sliced, the carriage will rise above the worm threads and upward movement thereof will cease. After the cut of meat has been completely sliced, the clutch is released and the weight of the carriage 88 will cause the carriage to slide down guides 102, 104 to the initial starting position. Downward movement of the carriage is restrained by means of a counterbalance system. As shown in FIG. 1, a cable 107 is attached to a U-shaped element 109 which in turn is secured to the carriage 88. The cable 107 passes over an upper pulley 111. Upon raising of carriage 88, the cable is wound onto an associated spring restrained reel, not shown, and is slowly unwound upon descent of the carriage. An elastomeric bumper 113 (FIG. 11) is provided on the lower end of guide 102 to cushion the carriage 88 at the end of its descent.

Figure 12:
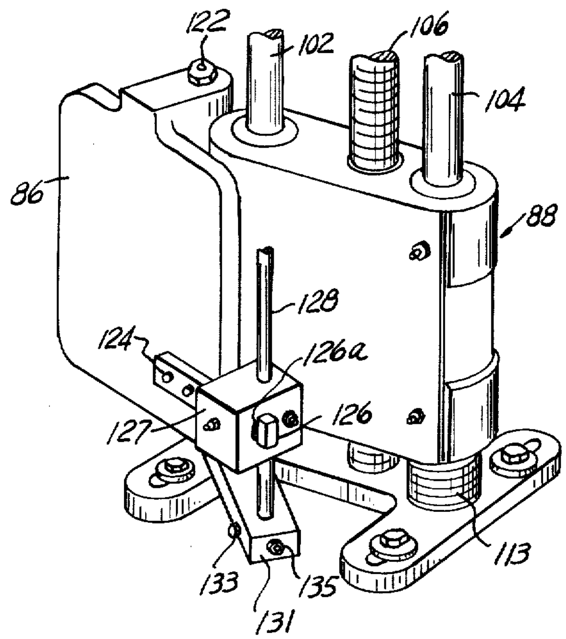
FIG. 12 is a partial perspective view showing the detail of the carriage or elevator and its mounting.
Figure 13:
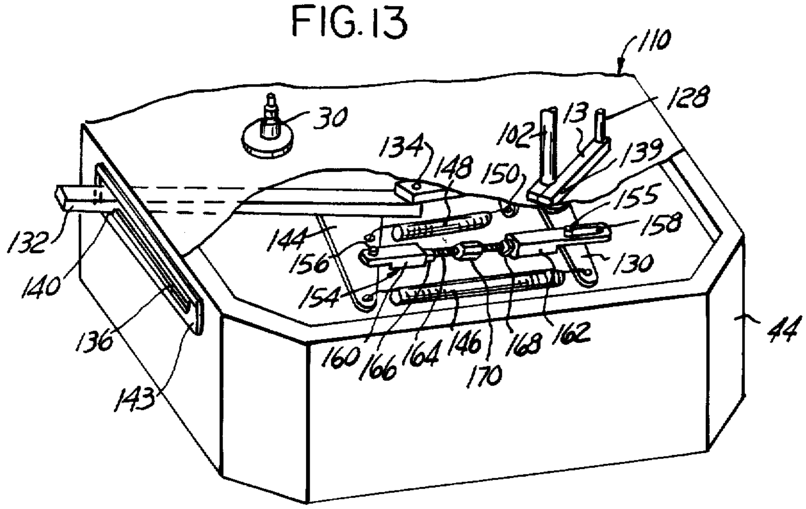
FIG. 13 is a fragmentary perspective view showing the parts of the mechanism for controlling the knife.

The means for tensioning the knife blade against the meat may be best seen in FIGS. 1, 12 and 13. As previously mentioned, the knife structure is mounted on pivotal plate 86. The plate 86 is pivotally mounted at 122 for pivoting about a vertical axis.

As shown in FIG. 12, the plate 86 has a finger 124 secured thereto. The finger 124 is received in a slot 126 of block 127 which slidingly receives a vertical guide rod 128. The rod 128 is fixedly connected by locking screws 133, 135 at its upper and lower ends to horizontally pivotal support structures 129, 131 which in turn are fixedly connected by pins 137, 139 to pivotal guide shaft 102. Referring to FIG. 12, a pivotal arm 130 is keyed to the guide shaft 102.

A manually operable handle structure is provided to cause pivoting of the arm 130. The manual means include an arm 132 which is rotatably mounted on a vertical pin rod 134. The arm 132 is capable of slight up and down pivoting and extends horizontally through an elongated opening 136 provided in the element 143. The opening 136 includes a downwardly extending detent 140 at one end. The arm 132 normally bears downwardly against the lower edge of the opening 136 and when the arm is pivoted to a position over detent 140, it will fall into the detent, thus locking the arm in this pivoted position.

The arm 132 is provided, adjacent its inner end, with an extension 144 which projects outwardly therefrom at substantially right angles. The extension 144 is connected to the arm 130 by means of a spring 146 which extends between the outer ends of these members. A second spring 148 extends from the extension 144 into engagement with a bracket 150 which is secured to a fixed structure. An elongated member 154 is pivotally mounted by a pin 156 to the extension 144. The member 154 has an elongated opening 158 extending longitudinally thereof adjacent the opposite end of the pin 156.

In operation, the arm 132 is manually moved into engagement with the detent 140. This movement causes pivoting of the arm 130 via the member 154. Pivoting of arm 130 causes rotation of the guide 102. Rotation of the guide shaft causes rotation of the rod 128 which is connected thereto. The rod 128, which is slidingly connected to finger 126, carries with it the plate 86 to thus pivot the knife blade 72 towards the ham 28 mounted in the slicer.

Upon initial movement of the arm 132, the spring 146 will tend to stretch out rather than to move the relatively heavy structure associated with the knife blade 72. While the spring 146 will eventually cause movement of the structure, the heavy stress on spring 146 would cause rapid deterioration of the spring. The member 154 is thus provided to effectuate the initial movement of the structure associated with the knife blade. When the arm 132 is moved toward the detent 140, the spring 146 will stretch out until the outer end of opening 158 engages the pin 155 on arm 130. A rigid connection will then be formed between the extension 144 and the arm 130, causing movement of the arm 130. Assuming an average diameter bone, the arm 130 will eventually come to rest with the pin 155 intermediate the ends of opening 158. This position permits the knife blade to move either inwardly or outwardly to the extent of the length of opening 158.

The spring connection of arm 130 with extension 144 permits the arm 130 to move when the force is applied thereto. Consequently, when the knife blade 72 contacts the thick portion of the bone in the meat, it can move outwardly away from the bone. When the ham thins down, the knife will move back towards the center of the cut of meat under the tension of spring 146. Thus, the knife will always cut right up to the bone and is able to cut meat having non-uniform diameter bones such as hams.

Upon release of the arm 132 from detent 140, the return spring 148 will cause the arm 132 to return to its initial position. When the arm 132 has moved a short distance, the inner end of the opening 158 and member 154 will contact pin 155 and thereafter cause rotation of the mechanism associated with the knife blade.

The member 154 is constructed as a turnbuckle for the purpose of adjustment. End portions 160, 162 are connected together by threaded member 164, this member having opposite hand threads at each end. Nuts 166, 168 normally lock the unit in adjusted position. When it is desired to make an adjustment, nuts 166, 168 are loosened and member 164 is rotated by means of wrench engageable element 170 to either lengthen or shorten member 154. The length of member 154 determines the depth which the knife will enter the meat. In previous constructions, this adjustment had been made by loosening members 129, 131 on guide 102, then angularly adjusting rod 128. This led to misalignment of rod 128 with subsequent undue wear on the parts. In the present construction members 129, 131 are pinned in place and no misalignment is possible. The detail of that construction is shown in FIG. 11.

Figure 11:
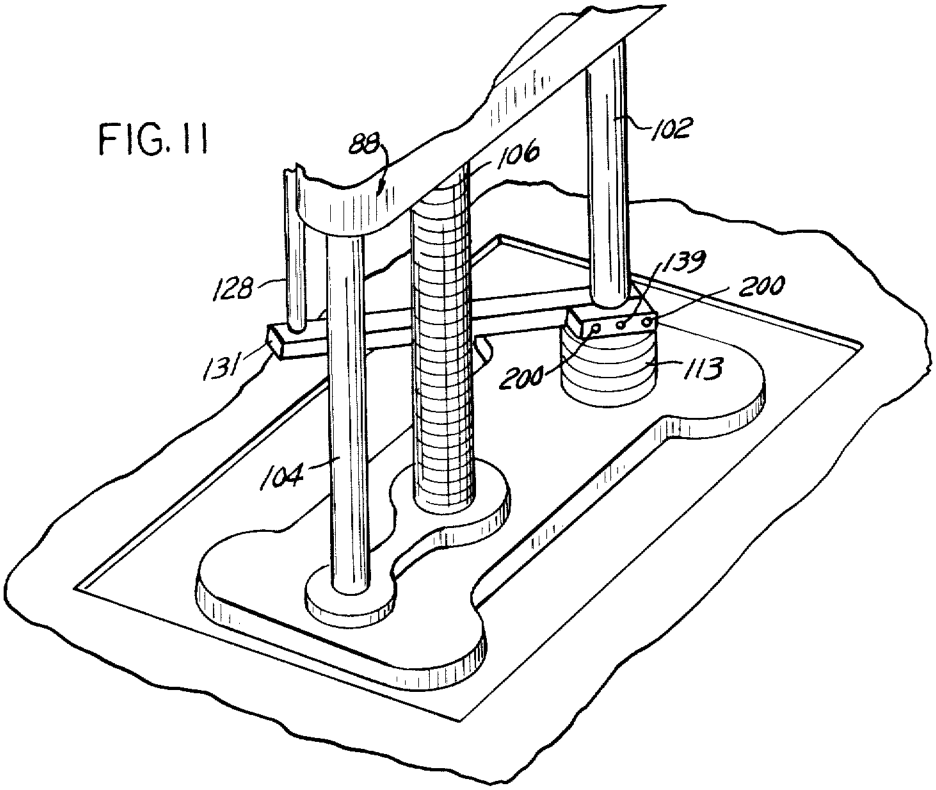
FIG. 11 is a perspective view to enlarged scale showing the type of pinning used at the upper and the lower ends of the elevator associated mechanism.

FIG. 11 shows the lower end of the guide rods 104 and 102. A like arrangement is included at the upper end of the guide rods 102 and 104 for pin and clamp connection. The geometry of the assembly including horizontal structures 131 and 129 and vertical guide rod 128 must be maintained constant with respect to rod 102. This relationship controls the operation of the shift mechanism best shown in FIG. 13. Otherwise stated, the movement of the clamps associated with structures 129 and 131 around the periphery of the rod 102 is stopped by pins 137 and 139. Tightening and loosening of the clamps for removal is done through a pair of metal screws 200.

Figure 2:
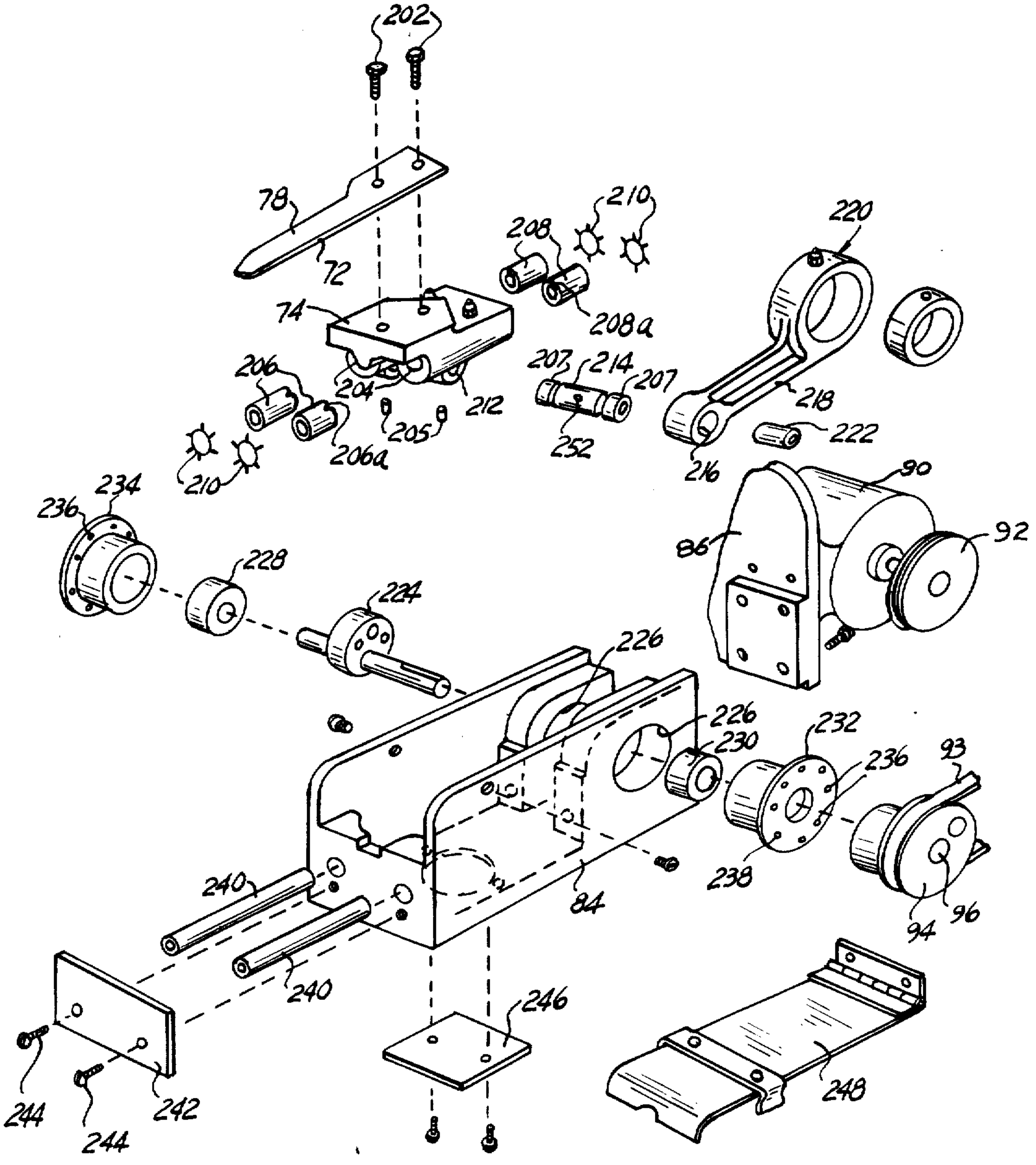
FIG. 2 is an exploded perspective view showing the detail of the mechanism for providing an oscillating and cutting movement to the knife.

Reference is made to FIG. 2 for its showing of the detail of the oscillator associated with the knife 72 and the block 74. The knife 72 is fastened to the block 74 by a pair of screws 202. The block 74 has fitted in its longitudinal openings 204 a set of four bushings 206 and 208. A like number of retainers 210 are used to hold the four bushings in place. A further transverse opening 212 is formed in the lower portion of the block 74 and is adapted to receive a wrist pin 214. The wrist pin 214 is inserted in an opening 216 formed in the forward extending arm 218 of the connecting rod 220. A further bearing 222 is used in the opening 216.

Also included in the oscillator assembly and associated with the oscillator housing 84 is the one-piece crankshaft 224 which is inserted and journalled in openings 226 formed in the oscillator housing between a pair of ball bearings 228 and 230, better shown in FIG. 6, hereinafter.

It will be seen that a pair of bearing holders 232 and 234 are included for holding the bearings 230 and 228, respectively. Five fastener openings 236 are included in each bearing holder for fastening the bearing retainers to the side walls of the oscillator housing 84 by screws 236*a*. A further set of three tapped poles 238 are further provided in bearing holders 232 and 234, respectively. In the removal of the parts of the bearing assembly for inspection or replacement, each screw 238*a* is tightened in the tapped holes 238 one turn at a time, and thus it is possible to ease the bearing holders out so that the bearings can be readily removed and attended to.

Also associated with the oscillator housing 84 are a pair of guide rods 240 and a guide rod retainer plate 242. A plurality of screws 244 are used to attach the retainer plate 242 to the left end wall of the oscillator housing 84. A pair of screws 205 are provided with upper spherical ends engagable with the two peripheral grooves 207 of the wrist pin 214. An inspection plate 246 is provided in the bottom of the oscillator housing 84 to permit inspection and tightening of the screws 205 when required. An oscillator cover assembly 248 is shown attachable to the vertically oriented backplate 86.

The oscillator parts receive their drive from oscillator motor 90 and motor pulley 92. Rotative drive is transmitted through the timing belt 93 to the oscillator pulley 94 and thence through the shaft 96 to rotate the crankshaft 224 and thus to oscillate the block 74 through the operation of the connecting rod 220.

It will thus be seen that we have provided in the construction of our oscillator a mechanism in which disassembly may be made quickly and simply so that the bearings and other worn parts may be removed and replaced. This, again, is achieved by the manner of construction of the bearing holders 234 and 232 and through the provision of tapped holes spaced around the periphery of an end flange formed in the bearing holders so that tightening screws one turn at a time in these holes serves to ease the bearing holder out with the bearing in place.

Reference is now made to FIGS. 3 and 4 for their showing of further detail of the oscillator and the manner in which lubrication is provided. A pair of lubrication fittings 250 are provided in the upper surface of the slide block 74. A further fitting 252 is provided in the top surface of the connecting rod 220. As has already been shown in FIG. 2, each of the bushings 206, 208 has a lube cut-out portion formed at one edge thereof and identified by the numerals **206*a* and 208*a*, respectively. With lube introduction through the openings 250, the grease is forced through the path indicated by arrows in FIG. 4 around the bushings 206, 208 then laterally through internal channels formed in the wrist pin 214 and finally outwardly through a central channel formed in wrist pin 214 and identified by the numeral 252. The ends of the horizontal channel through wrist pin 214 are sealed by suitable plugs, not shown. Thus there is a complete lubricant path provided around the bushings that control the sliding movement of slide 74 and through the wrist pin 214 to the bushing which controls the rotative movement of the connecting rod 220**.

FIG. 5 shows the manner in which the bushings 206 are arranged end to end with their lubrication notches **206*a* adjacent to provide the flow shown in FIG. 4. A like relationship between bushings 208 and their lubrication notches is also shown in FIG. 5**.

FIGS. 6 and 7 are used to clarify the manner in which the ball bearings 228 and 230 are mounted with respect to bearing holders 234 and 232 and with respect to the crankshaft 224 held between them. The bearing holders 232 and 234 are shown in their assembled positions with threaded fasteners **226*a* in place. FIG. 7 is a fragmentary view showing the manner in which the right hand bearing holder 232 is removed from the assembly by first removing screws 236 and then inserting elongated screws 238*a* and tightening them one turn at a time in their three tapped hole positions spaced about the periphery of the bearing holder 232** so that the bearing holder with associated ball bearing is dropped out of the assembly.

FIG. 8 shows a portion of the mechanism used to lock the carriage wormwheel 260. This is the gear which, when driven, coacts with worm 106 so that the carriage 88 carrying the knife 72 is moved upwardly during a cut. Shown in perspective view are the inner surface of the vertically movable carriage 88 with the vertically oriented openings for engaging rods 102 and 104. The wormwheel 260 is shown moved sidewardly from the position in which it would normally be engaged with the worm 106. Included about the periphery of the wormwheel 260 are a plurality of shaped teeth 262. Included inside its clutch face 264 are a plurality of teeth **264*a* each of which is shaped with a female taper. A cross piece 266 is spring mounted on a plunger device 268 and includes at its upper and lower ends an end portion 270 and 272 each of which is given a male taper adapted to engage with the opposed female taper portion of clutch teeth 264*a* on the wormwheel 260**. In this way, there is positive locking engagement made and undesired movement or vibration of the carriage and associated mechanism is prevented.

Figure 10:
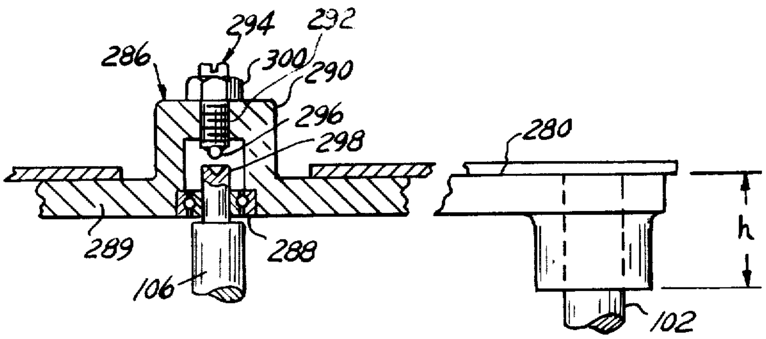
FIG. 10 is a fragmentary sectional view showing my improved end play adjuster assembly.

FIGS. 9 and 10 show the detail of am improved lead screw end play adjusting means and bridge construction for holding the several guide rods and other parts in vertical alignment. It will be seen that the bridge assembly in an alternate and preferred embodiment to that shown in FIG. 1 includes a plate 280 having an upturned edge 282 at one side and a like edge, not shown, at the other side. Fasteners 240 are used to attach the bridge plate 280 securely in position at its edges. If it is necessary to remove any of the associated parts of the guide rods 102, 104 or worm 106 for servicing or to remove any of the additional parts associated with the carriage 88, this is facilitated by the new mode of construction. By reason of the direct connection of the plate 280 to the side walls, its removal leaves nothing remaining to impede the vertical lift-out of the parts below. This greatly simplifies prior arrangements in which similar bridge plates were mounted on cross rods and it was not possible to immediately move the entire mechanism without, at least, partial disassembly of the skin parts to remove the cross rods.

Also shown in FIGS. 9 and 10 is my new end plate adjuster device which is indicated generally by the numeral 286. The end play with which we are concerned is that occurring with the worm 106. As shown to enlarged scale in FIG. 10, the end play adjuster 286 is attached to the under surface of the bridge plate 280 by a suitable means. The upper end of the worm 106 is mounted in a bushing 288 which is seated in the lower surface of the end plate adjuster 286. There is provided an added boss 290 on the top of the plate 289. The boss 290 includes a threaded opening 292 adapted to receive an adjustment screw 294. A hardened spring plunger 296 is mounted at the lower end of the adjustment screw 294 while the end of the worm 106 is center drilled at its upper end as indicated by the numeral 298. A further lock nut 300 is used to hold the assembly in place once adjustment has been made. It will be seen that the small hardened spring plunger 296 can be tightened up and down until a certain amount of pressure is brought to bear on the end of the worm 106 thus reducing and minimizing the amount of up and down movement of the worm 106.

FIGS. 14 and **14*a* show a self-aligning seal assembly used to cover the upper end of the drive shaft from the drive motor 30. It is necessary that a seal assembly be used which will accurately register over the end of the drive shaft 30 to the deck 301 of the slicer. Location of the parts with respect to a pre-drilled opening 302 in the deck 301 and the drive mechanism is exceedingly difficult because of misalignments and assembly problems. The seal assembly as shown in FIG. 14 overcomes these problems and operates to retain the shaft end 30 and seal it against contamination from meat fats and the like during the slicing operations. The assembly includes an upper cap 304 with rim 306 extending about its periphery. A plurality of openings 307, three in number, are equally spaced about the periphery of the rim 306 and these are adapted to be fastened by three threaded fasteners 308 which fit through mating openings into locking engagement with nuts 310 fixed by welding or like process to the lower surface of the deck 301. The seal part of the assembly is indicated by the numeral 312 and includes a peripheral elastic rim 314** which is pressed into place within the central portion of the cap 304. Firm sealing engagement about the end of the shaft 30 is provided by the deformable central parts 316 of the seal 312. It will thus be seen that, independently of the relative locations of opening 303 and shaft 30, it is possible to install a seal assembly which will appropriately fit about the shaft end and fasten to the deck 301.

Referring to FIGS. 1 and 16, the spiral meat slicer 10 has means for mounting the meat which include an upper axially adjustable support 14 and lower rotatably driven support 16. The upper support 14 comprises a bracket 18 having an opening therethrough. The bracket 18 is mounted on a structural member 20. Slidably received in the bracket 18 is an axially adjustable rod 22. The rod 22 is secured in adjusted positions by means of a set screw 24 threadingly received in the bracket 18. A rotatable prong structure 26 is provided on the lower end of the rod 22 to engage a ham 28.

As shown in FIG. 16, the rotatable prong structure 26 is a generally cylindrical body 12 which is rotatably mounted on the lower end of rod 22. A pair of grease or oil fittings 23, 25 are provided for lubricating purposes. A pair of prongs 27, 29 are threadingly engaged on the underside of body 12.

Opposing side portions of the body 12 are cut away at 31, 33 to form radially outwardly angled surfaces extending from the lower section of body 12 towards the upper section thereof. These surfaces define reliefs which permit outwardly angled meat and bone portions of the shank end 35 of ham 28 to project by the lower end of body 12 to permit firm engagement of prongs 27, 29 in the meat with the main ham bone 37 oriented as a substantially vertical axis for rotation.

The lower rotatably driven support 16 includes the power driven shaft 30 which extends upwardly. Carried on the shaft 30 is a prong structure 32 which engages the lower end of the ham 28. The prong structure 32 is mounted unto a disc shaped cover 34. The cover 34 provides a sturdy, meat-supporting surface.

Referring to FIG. 15, it may be seen that the ham 28 may be mounted between the upper and lower support members 14, 16. In mounting a ham, the butt end of the ham is inserted on the prong structure 32 to a position where the lower end of the ham rests on the plate 34. The leg bone 37 is positioned upright so that the bone forms a substantially vertical axis of rotation for the ham. After the ham has been positioned on the lower support, the upper support is lowered to insert the prong structure 26 into the shank end of the ham. The set screw 24 is then tightened and the ham is in position for slicing.

It will thus be seen that I have provided by my invention a novel and improved spiral meat slicer distinguished by its reliability and its servicability.

I claim:

1. A spiral meat slicer for forming a continuous spiral slice on a cut of meat having an irregularly shaped bone extending therein including a framework enclosing the meat slicer comprising:

- means for mounting the meat with the bone as a substantially vertical axis about which to rotate the meat;
- a vertically movable carriage;
- a horizontally pivotable support structure pivotally mounted on said carriage;
- a knife for slicing the meat mounted on said support structure, said knife being positioned with respect to the axis of rotation of the bone to enable a spiral cut to be made in the meat;
- means for longitudinally reciprocating the knife against the meat;
- means for rotating the meat;
- means for relatively moving said carriage vertically with respect to the meat to advance the knife along the axis of rotation of the meat to form a continuous spiral slice in the meat;
- lever means for moving the knife into slicing engagement with the meat;
- resilient means interconnecting said lever means with said support structure to yieldingly maintain the knife in contact with the meat bone;
- said means for relatively moving said carriage vertically with respect to the meat comprising a substantially vertical power driven worm, a freely rotatable worm gear mounted on said carriage in engagement with the worm, said worm having a reduced diameter upper end portion;
- means for rotatively retaining the upper end portion of said worm comprising a bridge plate spanning opposed sides of said framework and having its edge portions attached to such sides by threaded fastener means; and
- a bearing mounted in said bridge plate for journalling said upper end portion of said worm and a flat end surface of such end portion including a circular center drilled portion engagable with a variable magnitude downward force applying means, said last means axially aligned with said center drilled portion.

2. The combination as set forth in claim 1 wherein said downward force applying means comprises a threaded end play adjuster having a hardened spring plunger, said plunger axially aligned with said center drilled portion.

3. A spiral meat slicer for forming a continuous spiral slice on a cut of meat having an irregularly shaped bone extending therein comprising:

- means for mounting the meat with the bone as a substantially vertical axis about which to rotate the meat;
- a vertically movable carriage;
- a horizontally pivotable support structure pivotally mounted on said carriage;
- a knife for slicing the meat mounted on said support structure, said knife being positioned with respect to the axis of rotation of the bone to enable a spiral cut to be made in the meat;
- means for longitudinally reciprocating the knife against the meat;
- means for rotating the meat;
- means for relatively moving said carriage vertically with respect to the meat to advance the knife along the axis of rotation of the meat to form a continuous spiral slice in the meat;
- lever means for moving the knife into slicing engagement with the meat;
- resilient means interconnecting said lever means with said support structure to yieldingly maintain the knife in contact with the meat bone;
- said means for relatively moving said carriage vertically with respect to the meat comprising a substantially vertical power driven worm;
- a freely rotatable worm gear mounted on said carriage in engagement with the worm;

clutch means controlling vertical movement of the elevator comprising a plurality of tapered clutch teeth internally formed on said worm gear; and
a plunger assembly cooperable with said clutch teeth and including a latch bar having tapered ends engagable in tight and correspondingly tapered and abutting relationship with said clutch teeth of said worm gear.

4. The combination as set forth in claim 3 including:
a vertical guide rod fixed to such lever means;
means cooperable with said guide rod and said support structure to maintain a constant pressure on said knife during the vertical travel of said carriage, said means comprising a horizontally pivotal frame including upper and lower horizontal members; and
a fastening means including a pin for attaching each of said frame members to said vertical guide rod.

5. The combination as set forth in claim 4 wherein said fastening means comprises said pin for angularly fixing the relationship of said frame members relative to said guide rod and a clamp having a pair of threaded fasteners for holding said frame members and guide rod together.

6. The combination as set forth in claim 3 including:
a vertical guide rod fixed to such lever means and means cooperable with said guide rod and said support structure to maintain a constant pressure on said knife during the vertical travel of the carriage comprising a horizontally pivotal frame including a vertical guide rod, a follower block having a central opening journaled on said rod for sliding vertical movement, and a finger mounted on said support structure and connecting said support structure to said follower block.

7. The combination as set forth in claim 3 wherein said means for mount the meat comprises a table including a plurality of upstanding prongs for penetrating the meat at its lower end
and a body rotatably mounted proximate the other end of the meat; said body including at least one skived side portion and a plurality of downwardly extending prongs for engaging said other end.

8. A spiral meat slicer for forming a continuous spiral slice on a cut of meat having an irregularly shaped bone extending therein comprising:
means for mounting the meat with the bone as a substantially vertical axis about which to rotate the meat;
a vertically movable carriage;
a horizontally pivotable support structure pivotally mounted on said carriage;
a knife for slicing the meat mounted on said support structure, said knife being positioned with respect to the axis of rotation of the bone to enable a spiral cut to be made in the meat;
means for longitudinally reciprocating the knife against the meat;
means for rotating the meat;
means for relatively moving said carriage vertically with respect to the meat to advance the knife along such axis of rotation to form a continuous spiral slice in the meat;
lever means for moving the knife into slicing engagement with the meat;
resilient means interconnecting said lever means with said support structure to yieldingly maintain the knife in contact with the meat bone;
said means for longitudinally reciprocating said knife including a crankshaft, a pair of bearings mountable at each end of said crankshaft and a pair of bearing holders, each associated with one of said bearings; and
a housing for holding said reciprocating means;
said bearing holders mountable in said housing for slidably oscillating said knife;
each of said bearing holders including an end flange having a plurality of tapped openings spaced around its periphery and cooperable successively with a threaded member for removing said bearing holder along with its associated bearing from said housing.

9. A spiral meat slicer for forming a continuous spiral slice on a cut of meat having an irregularly shaped bone entending therein comprising:
means for mounting the meat with the bone as a substantially vertical axis about which to rotate the meat;
a vertically movable carriage;
a horizontally pivotable support structure pivotally mounted on said carriage;
a knife for slicing the meat mounted on said support structure, said knife being positioned with respect to the axis of rotation of the bone to enable a spiral cut to be made in the meat;
means for longitudinally reciprocating the knife edge against the meat;
means for rotating the meat;
means for relatively moving said carriage vertically with respect to the meat to advance the knife along such axis of rotation to form a continuous spiral slice in the meat;
lever means for moving the knife into slicing engagement with the meat;
resilient means interconnecting said lever means with said support structure to yieldingly maintain the knife in contact with the meat bone;
said means for longitudinally reciprocating said knife including a mounting block for the knife, a crankshaft and a connecting rod operably connected between said block and said crankshaft;
a housing holding said block;
a bearing means mounted in said block for providing free sliding movement of said block relative to said housing;
a wrist pin mounted in said block intermediate said block and said connecting rod, said wrist pin having a central opening therethrough; and
said bearing means having a notched opening therethrough for providing a continuous lubricant path around said bearing means and through said central opening of said wrist pin.

10. The combination as set forth in claim 9 wherein said bearing means comprises a pair of sleeve bearings in end-to-end relationship with a notch formed proximate their adjacent ends for providing such path.

11. The combination as set forth in claim 10 wherein said sleeve bearings are mounted in an opening in said block with a mechanical clearance therefrom and said wrist pin includes at least one peripheral groove in it communicating between its central opening and the opposed surface of said connecting rod.

12. A spiral meat slicer for forming a continuous spiral slice on a cut of meat having an irregularly shaped bone extending therein including a framework enclosing the meat slicer comprising:

a deck for mounting the meat with the bone as a substantially vertical axis about which to rotate the meat;

a vertically movable carriage;

a horizontally pivotable support structure pivotally mounted on said carriage;

a knife for slicing the meat mounted on said support structure, said knife being positioned with respect to the axis of rotation of the bone to enable a spiral cut to be made in the meat;

means for longitudinally reciprocating the knife against the meat;

means for rotating the meat including a vertically oriented drive shaft extending through said deck;

means for relatively moving said carriage vertically with respect to the meat to advance the knife along the axis of rotation of the meat to form a continuous spiral slice in the meat; and a removable seal assembly for enclosing said drive shaft end comprising an upper cap and an external rim portion extending around said cap, said rim portion including a plurality of equally spaced openings; a like plurality of fastening means extendible in locking engagement between openings and opposed openings in said deck and a circular seal of "u" shaped cross sectional configuration and compressible in said cap and about said drive shaft end in sealing engagement therewith.

* * * * *